UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

POLYAZO BLACK DYE.

SPECIFICATION forming part of Letters Patent No. 557,439, dated March 31, 1896.

Application filed September 5, 1895. Serial No. 561,575. (Specimens.)

*To all whom it may concern:*

Be it known that I, JAKOB SCHMID, a citizen of Switzerland, residing at Basle, Switzerland, have invented new and useful Improvements in the Production of Blue-Black Coloring-Matters or Dyestuffs, of which the following is a specification.

My invention relates to the production of new blue-black polyazo dyes which produce blue-black tints on unmordanted cotton in an alkaline or neutral bath, having the characteristics of being developed to a deep black of great fastness to washing and light by rediazotizing on the fiber and by combining with amins, amidophenols, or phenols.

I herewith describe the blue-black coloring-matter which I obtain from two molecular proportions of amidonaphtholmonosulfo-acid and one molecular proportion of the intermediate product resulting by the action of two molecular proportions of tetrazo-diphenyl with one molecular proportion of 1.8 amidoöxynaphthalene, 3.6 disulfo-acid, and corresponding to the formula:

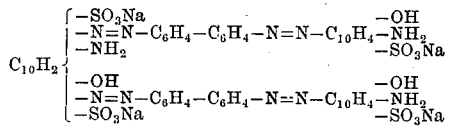

In order to carry out my invention, I may proceed as follows: The tetrazo compound derived from 18.4 kilos of benzidin is introduced into a cooled alkaline solution of 18' kilos of 1.8 amidonaphthol, 3.6 sulfonate of soda. The mixture, which first has a violet coloration, turns into black and after a short time separates out the new intermediate product of a black hue containing two free diazo groups capable of being combined with two molecular proportions of amidonaphtholmonosulfo-acid or other components. After about three hours' rest the intermediate product is introduced into an alkaline solution of twenty-eight kilos of gammaämidonaphtholmonosulfonate of soda. The mass of reaction is stirred during twelve hours, then heated up, and the black precipitate of the dyestuff is filtered off.

In the dry state the new polyazo dye forms a black powder with a bronze-like luster soluble in water with a black violet in concentrated sulfuric acid with a pure blue coloration, from which solution on addition of water the free acid of the coloring-matter separates out in the form of insoluble violet-black flakes. It is insoluble in alcohol, ether, and benzene.

Instead of benzidin other paradiamins—as, for instance, tolidin, ethoxybenzidin—and instead of 1.8 amidoöxynaphthalene, 3.6 disulfonic acid, 1.8 dioxynaphthalene, 3.6 disulfonic acid may be used. The gammaämidonaphtholmonosulfonate may be partly or totally replaced by amidoöxysulfonaphthoic acid.

What I claim as new, and desire to secure by Letters Patent, is—

The blue-black polyazo dye which corresponds to the general formula—

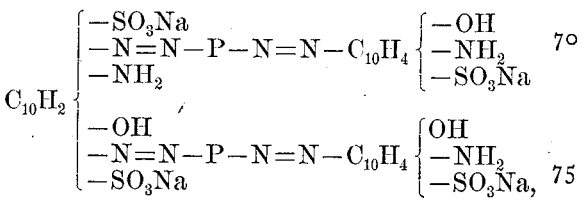

where P represents the radicle of a paradiamin such as benzidin, tolidin and ethoxybenzidin and which forms a black powder with a bronze-like luster, insoluble in alcohol, ether and benzene, but soluble in water with a black violet—in concentrated sulfuric acid with a pure blue coloration, from which solution, on addition of water the free acid of the coloring-matter separates out in the form of insoluble violet-black flakes. In an alkaline bath the new coloring-matter dyes unmordanted cotton blue-black shades which may be developed on the fiber to a deep black fast to washing and light.

In testimony whereof I have hereunto set my hand in the presence of two subscribing witnesses.

JAKOB SCHMID.

Witnesses:
GEORGE GIFFORD,
FRITZ WALTERS.